United States Patent [19]
Rehn et al.

[11] 4,116,280
[45] Sep. 26, 1978

[54] SPRING RESET MECHANISM

[75] Inventors: Gary Allen Rehn, Andover; Robert Otto Taube, Moline, both of Ill.

[73] Assignee: Deere & Company, Moline, Ill.

[21] Appl. No.: 778,975

[22] Filed: Mar. 18, 1977

[51] Int. Cl.$^2$ .............................................. A01B 61/04
[52] U.S. Cl. ..................................... 172/266; 172/269
[58] Field of Search .............. 172/265, 266, 267, 268, 172/269, 264, 270

[56] References Cited
U.S. PATENT DOCUMENTS

| | | | |
|---|---|---|---|
| 2,850,957 | 9/1958 | Silver | 172/269 |
| 2,860,564 | 11/1958 | Silver | 172/266 |
| 3,302,728 | 2/1967 | Sullivan | 172/269 |
| 3,321,027 | 5/1967 | Johnson | 172/266 |
| 3,527,307 | 9/1970 | Bushmeyer | 172/266 |
| 3,662,839 | 5/1972 | Thorsrud | 172/266 |
| 3,910,354 | 10/1975 | Johnson | 172/267 |
| 3,972,374 | 8/1976 | Venable | 172/266 |

*Primary Examiner*—Richard J. Johnson

[57] ABSTRACT

A safety trip mechanism for a ground working tool utilizes a roller pin engageable with a notched and spring biased latch to resist collapse of a toggle linkage and rotation of the tool supporting standard as obstacles are encountered by the tool. The roller pin is rigidly connected to one toggle link and spaced from the frame which supports the standard to reduce the breakout force acting on the pin. Flattening of the roller pin surface and wear between the pin and its latch are accordingly reduced to improve reliability of the trip mechanism and decrease maintenance.

12 Claims, 4 Drawing Figures

SPRING RESET MECHANISM

BACKGROUND OF THE INVENTION

The present invention relates generally to earth working agricultural implements and more specifically relates to trip mechanisms which enable a tool support and earth working tool to rotate as obstructions are encountered to avoid structural damage.

Earth working implements having safety trip mechanisms are old in the art. These mechanisms include those which automatically reset after being tripped and those which do not automatically reset. Trip mechanisms not designed to reset automatically include both toggle link and roller pin types. For examples of these mechanisms, see U.S. Pat. Nos. 2,860,564 and 2,850,957, respectively.

Toggle link trip mechanisms are held in an uncollapsed position by springs and resist tripping by tolerating compressive forces through the toggle links. The links are designed to collapse about their common joint and permit rotation of the tool supporting standard after the compressive forces have exceeded a threshold value sufficient to overcome the spring force. These trip mechanisms are not consistently responsive to defined force levels due to variations in manufacturing tolerances and material characteristics. Therefore, the threshold force required to trip the mechanism often varies.

Roller trip mechanisms typically provide a roller pin carried by the standard which is tripped from a spring loaded notched or cam surface on the link or frame. The trip mechanisms are designed to trip as a predetermined force is applied. However, as the interacting pin and notched surfaces become flattened or worn, forces different than from the forces for which the trip mechanism is designed often cause the pin to release from the notched or cam surface. Further, threshold forces required to trip the mechanisms often vary from the designed threshold force due to defects in manufacturing, inconsistencies in materials used, and poor maintenance and lubrication habits of owner-operators.

SUMMARY OF THE INVENTION

To overcome these problems a roller trip mechanism has been provided between the frame and tool support which includes a trip link that aids in reducing the break out force required between the roller and its cooperating cam or notched latching surface. The improved mechanism includes a roller pin carried by a rigid link pivotally mounted on the frame above the standard and a spring biased latch member pivotally carried by the tool standard and releasably engageable with the roller pin. The trip link is connected between the standard and the roller link so as to resist the forces urging the standard to trip and is positioned relative to the roller pin link so as to require only minimum forces between the roller and its cooperating latch surface to enable the roller pin to prevent tripping of the standard.

Because the roller will incur reduced forces prior to and during release as obstacles are encountered, it will less often develop flattened surfaces which cause unpredictable or delayed tripping. Further, manufacturing tolerances of the roller and its cooperating cam or notched surface need not be as restrictive nor must the cooperating surfaces be frequently lubricated as would be required with existing pin trip mechanisms.

DESCRIPTION OF THE PREFERRED EMBODIMENT

Figure 1:
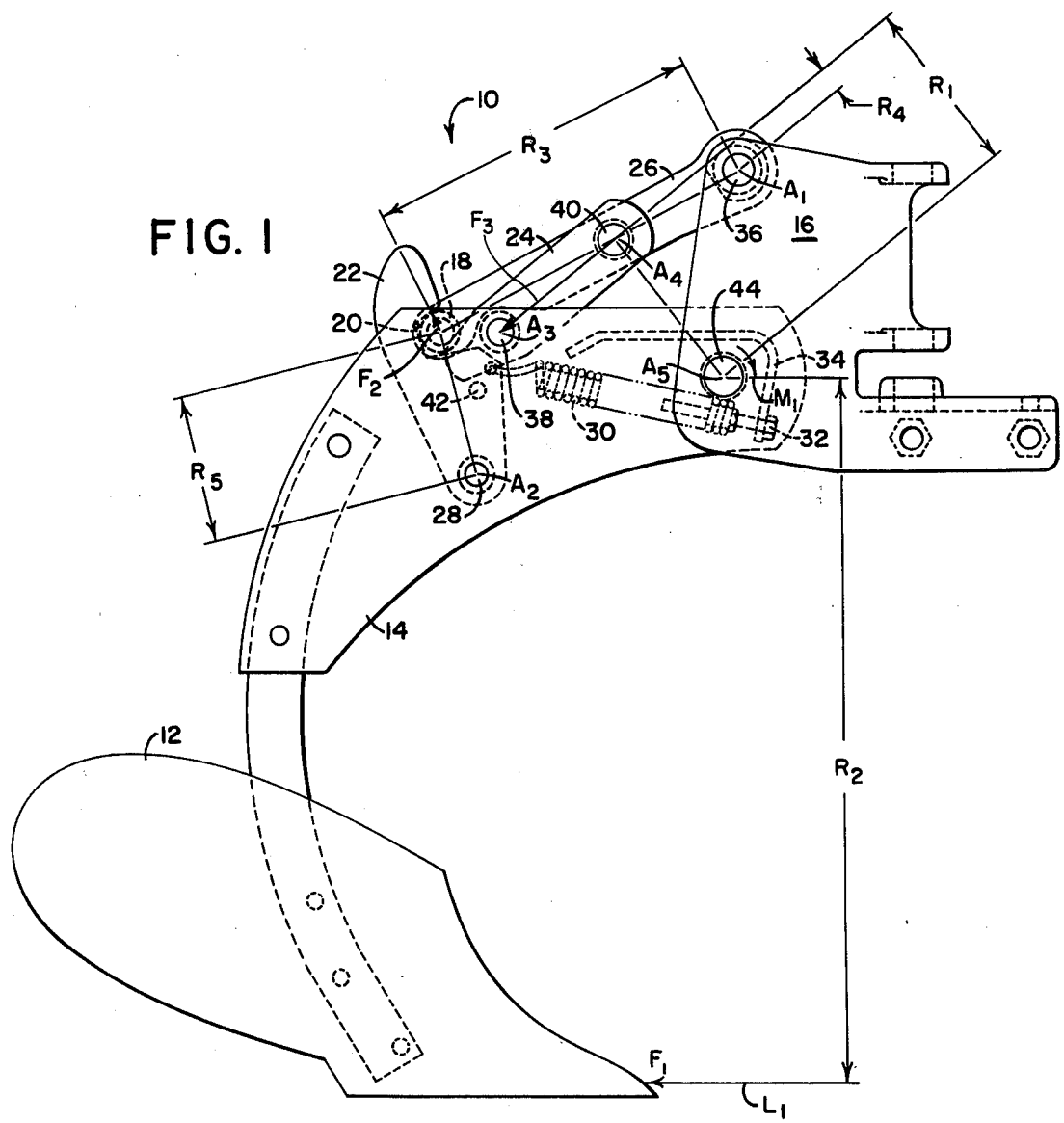
FIG. 1 is a side elevation view of the roller trip mechanism in combination with a mold board plow.

FIG. 1 illustrates the trip mechanism 10 in combination with a mold board plow 12. The plow is rigidly fixed to a standard 14 which in turn is pivotally mounted on a frame 16 attachable to a typical tool bar (not shown).

In the following discussion, clockwise and counter-clockwise references will relate to the plow 12 and trip mechanism 10 as viewed in FIG. 1.

The roller trip mechanism 10 acts between the frame 16 and standard 14 and includes a roller pin 18 releasably engaged in a notched portion 20 of a spring biased latch member 22. A trip link 24 pivotally interconnects the standard 14 with a roller link 26. Preventing the link 26 from rotating clockwise and the standard 14 from tripping as the roller pin 18 engaged with the notched portion 20 of the latch member 22.

The roller link 26 is mounted on the frame 16 for swinging movement about a horizontal pin 36 having an axis of rotation A1. The link 26 extends rearwardly from the pin 36 and supports the roller pin 18 at its free or rear end. This pin 18 is mounted in the link 26 for free rolling movement to assure more simple engagement and disengagement with the forwardly opening notch 20 of latch member 22. The pin 18 is normally seated in the notched portion 20 as illustrated in FIG. 1. The latch member 22 is pivotally mounted on the standard for limited swinging movement about the horizontal axis A2 of pivot pin 28. The member 22 is biased forwardly by tension spring 30 to maintain engagement between the roller 18 and the notched portion 20. The biasing spring 30 is hooked to the latch 22 directly below the notched portion 20 and attached by bolt 32 to a bracket 34 carried by the tool support 14.

Figure 4:
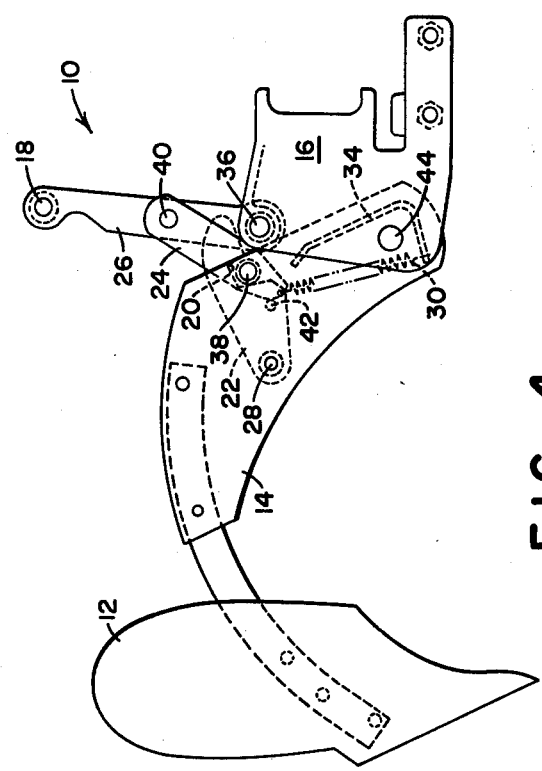
FIG. 4 is a view similar to FIG. 3 but illustrates the trip mechanism in its fully raised position.
Figure 3:
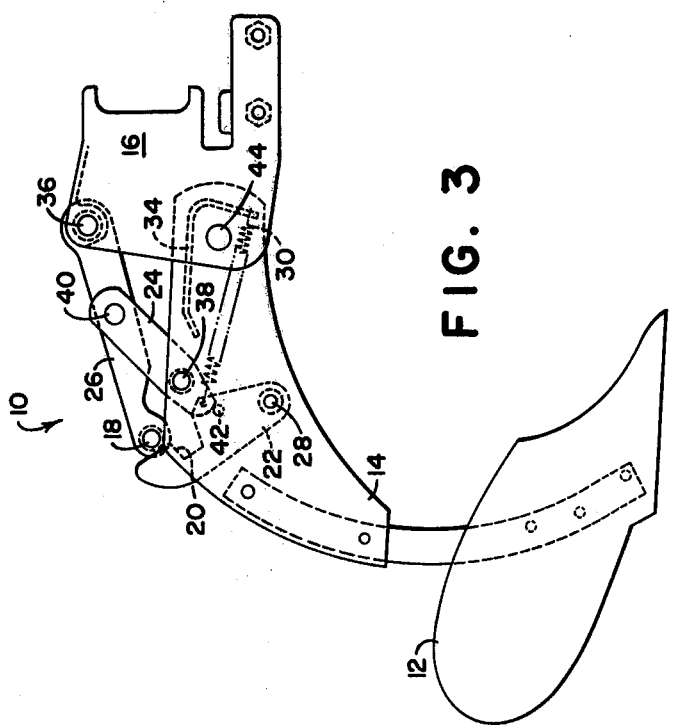
FIG. 3 is a reduced elevational view similar to FIG. 1 but illustrating the positions of the trip mechanism parts immediately upon release of the roller pin from the notched latch member.

The trip link 24 is pivotally connected by a pin 38 to the standard 14 which, as shown in FIGS. 1, 3 and 4, is rearwardly of the pin 36 securing the roller link 26 to the frame 16. A pivot pin 40 secures the trip link 24 to the roller link 26 slightly above a plane passing through pin 36 and pin 38. The pins 38, 40, rotate about parallel horizontal axes of rotation designated respectively A3 and A4.

The latch member 22 further carries a stop means or pin 42 which abuts the link rearward of the trip link 24 surface after the roller 18 has tripped from the notch 20. As illustrated in FIGS. 3 and 4, this pin 42 limits clockwise or forward rotation of latch member 22 after it has been tripped. After the mechanism has been tripped and upon lowering the plow or standard the pin 42 slides along the rear surface of the trip link 24 and causes the trip mechanism to be reset.

Figure 2:
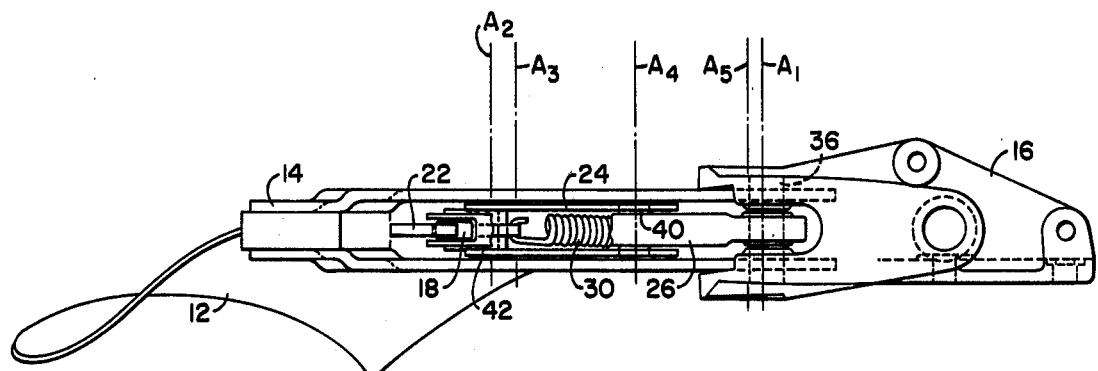
FIG. 2 is a plan view of the plow and trip mechanism illustrated in FIG. 1.

In normal plowing operation the plow 12 and trip mechanism 10 are as illustrated in FIGS. 1 and 2. The trip mechanism 10 is designed to release as the plow bottom 12 encounters abnormal draft forces such as would occur when rocks, stumps, or other such obstacles are contacted by the plow bottom 12.

When such an obstacle is encountered, the force F1 is imparted to the plow bottom 12 along a line L1. That force F1 generates a clockwise moment M1 about pin 44 and urges the standard 14 rearwardly and upwardly. Resisting the force F1 and acting to prevent tripping of the mechanism 10 are the trip link 24 and roller link 26. The trip link 24 is held in place by the roller link 26 which in turn is restrained by the latch member 22.

As the obstacle force F1 exceeds a predetermined value above which damage to the implement could likely occur, the roller pin 18 will be forced from the latch member 22 to permit swinging movement of the standard and plow about the pivot 44.

Clockwise movement of the standard 14 is ultimately resisted by the upper edge of notch 22 bearing against the roller 18. Consequently, resulting forces F2 are created between the roller 18 and notch 20 when forces F1 are applied against the plow bottom 12.

As the force F1 is applied to the bottom 12, force F3 acts through the trip link 24, about pin 44 and through moment arm R1 to resist the obstacle force F1 acting through the longer moment arm R2 about pin 44. Since R1 is shorter than R2 the resisting force F3 required by trip link 24 to prevent rotation of the standard 14 must greatly exceed the obstacle force F1.

The force F3 is directed along a line passing through the axes of pins 38 and 40 and at a distance R4 from axis A1 of pin 36. Since the pin 40 is fixed to the arm 26 there is a resulting clockwise moment F3R4 on link 26. This latter moment must be resisted with a force equal to F2 applied at a distance R3, the length of arm 26, from axis A1. Thus, the force F2 acting through link 26, clockwise about pin 36, and required to resist F3 and the release of the tripping mechanism is small relative to F3 and is in fact a R4/R3 proportion to F3. Further, it is clear that a comparatively small spring 30 may be used to retain the trip mechanism in notched position due to the lesser force requirement between the roller 18 and notch 20.

The roller pin breakout force F2 can thus be of a sufficiently small quantity that wear on and the flattening of the surfaces of the pin 18 and notched portion 20 of latch 22 is held to a minimum and consequently, reliability of the trip mechanism 10 is maintained even after much use.

The function performed by the rigid links 24 and 26 could be characterized as similar to that provided by a toggle linkage with the collapse of said links 24, 26 prevented by the roller pin 18 and latch member 22. To assure collapse of the links 24, 26, however, the pivot axis of pin 40 must be spaced above a plane passing through the axes of pins 36 and 38. Otherwise upon the tool 12 encountering an obstacle force F1, the mechanism 10 will lock and prevent rotation of the standard 14 about pin 44.

The roller pin 18 permits collapse of the links 24, 26 about their common joint 40 by forcing the latch member 22 counterclockwise about pin 28. To assure relative movement between the latch 22 and pin 18 the angle between the two planes passing through pins 28 and 18, and 18 and 36 must exceed 90°. An angle of less than 90° between these planes will also result in the trip mechanism 10 preventing rotation of the standard 14 about pin 44.

FIGS. 3 and 4 illustrate the relative positions of the trip mechanism 10 as the implement encounters an obstacle and the roller pin 18 escapes from the notched portion 20 to move to a fully tripped position. As is apparent from the drawings, the stop pin 42 prevents forward movement of the latch member 22 by abutting the rear surface of the trip link 24. As the plow 12 is raised by the operator after it has been tripped and the weight of the bottom causes the mechanism 10 to begin to reset, the stop pin 42 will follow in cam like fashion the rearward surface of the trip link 24 to return the latch member 22 to a position in which the roller pin 18 can be received into the notched portion 20.

We claim:

1. In an earthworking implement having a supporting frame, a tool support pivotally carried by the frame for swinging movement about a horizontal axis, an earthworking tool mounted on the support, a trip mechanism comprising: a first rigid link pivotally mounted to the frame above the support for swinging movement; a second rigid link pivotally connected at its one end with the tool support and at its other end with the first link; a releasable latch member carried on the tool support and engageable with the first link to prevent swinging movement of the support and first link; and resilient means acting on the latch member to maintain engagement of the latch member with the first link, but yieldable upon the tool encountering abnormal draft forces to permit disengagement of the latch member and first link.

2. The invention defined in claim 1 wherein the latch member includes a notched opening into which a pin carried by the first link is positioned to prevent swinging movement of the support and first link.

3. The invention defined in claim 1 wherein the latch member is yieldably urged into engagement with the first link by a spring carried by the support.

4. The invention defined in claim 1 wherein the tool support carries a guide element engageable with the latch member upon disengagement of the first link and latch member for repositioning the latter for engagement with the former.

5. A trip device for use with an earthworking implement having a supporting frame, a tool support pivotally carried by the frame, for swinging movement between lowered and rearwardly elevated positions, and an earthworking tool fixed to the support, said trip device comprising: a first rigid member pivotally mounted to the frame above the support; a second rigid member; first and second means connecting the second member at its one end to the support and at its other end to the first member; a latch member pivotally carried by the support and having a forwardly opening notched portion; a horizontally disposed roller carried by the first member and receivable in said notched portion; and resilient means urging said latch member forwardly so as to maintain engagement of the roller in said notched portion and oppose movement therefrom, but yieldable as said tool encounters abnormal draft forces, and said support is urged rearwardly to force the first and second members upwardly and the roller from the notched portion.

6. The invention defined in claim 5 wherein the upper surface of the notched portion is not parallel to a plane passing through the axes of rotation of the first member's pivotal connections with the frame and the center of the roller.

7. The invention defined in claim 5 wherein the angle between a first plane passing through the axes of rotation of the first member's pivotal connection with the frame and the center of the roller and a second plane passing through the latch member's pivotal connection with the support and the center of the roller exceeds 90°.

8. The invention defined in claim 5 wherein a plane passing through the axes of rotation of the first and second means connecting the second member respectively to the support and the first member if extended towards the pivotal connection of the first member with the frame would pass above the axis of rotation of said latter pivotal connection.

9. In an earthworking implement having: a supporting frame, a tool support pivotally carried by the frame, and an earthworking tool mounted on the support, a spring trip means comprising: a roller link; first means spaced above the support and pivotally connecting one end of the link to the frame for swinging movement about a first horizontal axis of rotation; a trip link; second means pivotally connecting the trip link with the support for swinging movement about a second horizontal axis of rotation; third means pivotally connecting the trip link with the roller link, said pivotal means having a horizontal axis of rotation parallel with said first and second axes, but spaced above a line passing through said first and second axes; a horizontal roller carried at the other end of the roller link; a latch member swingably carried by the support and including a forwardly opening notched portion engageable with the roller; and spring means connected to and for urging the latch member forwardly and the notched portion towards engagement with the roller.

10. In an earthworking implement having: a supporting frame, a tool support pivotally carried by the frame, an earthworking tool mounted on the support and an improved trip mechanism comprising: a first toggle link; a first pivotal structure supported by the frame above the support and connecting one end of said link with the frame for swinging movement above a first axis of rotation; a second toggle link; a second pivotal structure connecting one end of the second link with the support for rocking movement about a second axis of rotation; a third pivotal structure joining the toggle links together, the axis of rotation of said pivotal structure parallel to the first and second axes and spaced above a line passing through said first and second axes; and means resisting movement of said toggle links about the third pivotal structure including a horizontal roller carried by the free end of the first link, a latch member swingably carried by the tool support and having a forwardly opening notched portion releasably engageable with the roller and resilient means urging the notched portion of the latch member into engagement with the roller, but yieldable to permit disengagement of the roller from the notched portion upon the tool encountering abnormal draft forces.

11. In an earthworking implement having: a supporting frame, a tool support, means pivotally mounting the support on the frame for swinging movement between a lowered operating position and a rearwardly elevated position an earthworking tool fixed to the support and an improved safety-trip mechanism comprising: a first rigid link; first pin means pivotally mounting one end of the link to the frame for swinging movement about a first horizontal axis spaced above the pivotal means; a second rigid link pivotally interconnecting the first link with the tool support; a latch member having a forwardly opening notched portion; second pin means pivotally mounting the latch member on the support for rocking movement about a second horizontal axis; a horizontal roller carried on the other end of the first link, the axis of rotation of said roller defining a first plane with the first axis and a second plane with said second axis, the angle between the intersection of said planes at said roller being greater than 90° and biasing means yieldably urging said latch member forwardly to maintain engagement between the roller and the notched portion.

12. In an earthworking implement having a support frame, a plow support carried by the frame for swinging movement about a horizontal axis, a plow mounted on the support, a trip mechanism comprising: a first link pivotally connected to the frame above the support for swinging movement, a second link pivotally connected at its one end with the support and at its other end with the first link, a releasable latch member swingably carried on the tool support, cooperating latching elements between the first link and the latch member comprising a horizontally disposed member carried by one and receivable in a notched portion of the other to prevent swinging movement of the support and first link; and means biasing the latch member and its cooperating latching element towards engagement with the cooperating latching element carried by the first link, said biasing means yieldable upon the plow encountering abnormal draft forces to permit disengagement of said cooperating latching elements.

* * * * *